(12) United States Patent
Covi et al.

(10) Patent No.: US 7,298,601 B2
(45) Date of Patent: Nov. 20, 2007

(54) OVER-VOLTAGE PROTECTION FOR VOLTAGE REGULATOR MODULES OF A PARALLEL POWER SYSTEM

(75) Inventors: Kevin R. Covi, Glenford, NY (US); Raymond J. Harrington, Staatsburg, NY (US); Robert P. Makowicki, Staatsburg, NY (US); Steven G. Shevach, Hurley, NY (US); Dale F. Sorenson, Ruby, NY (US); Brian C. Tucker, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 11/199,644

(22) Filed: Aug. 9, 2005

(65) Prior Publication Data
US 2007/0035899 A1 Feb. 15, 2007

(51) Int. Cl.
*H02H 9/00* (2006.01)
*H02H 3/20* (2006.01)
(52) U.S. Cl. .................. 361/56; 361/57; 361/91.1; 323/272; 323/285
(58) Field of Classification Search .......... 323/272, 323/285; 363/56, 72, 57, 91.1
See application file for complete search history.

(56) References Cited

U.S. PATENT DOCUMENTS

| | | | | |
|---|---|---|---|---|
| 5,122,726 | A | * 6/1992 | Elliott et al. ............... | 323/272 |
| 5,559,376 | A | * 9/1996 | Tachikawa ................... | 307/86 |
| 6,160,386 | A | 12/2000 | Hemena et al. ............. | 323/272 |
| 6,278,597 | B1 | 8/2001 | Covi et al. .................. | 361/91.1 |
| 2003/0142513 | A1 | 7/2003 | Vinciarelli .................... | 363/17 |
| 2004/0150928 | A1 | 8/2004 | Goodfellow et al. .......... | 361/90 |
| 2004/0227495 | A1 * | 11/2004 | Egan et al. .................. | 323/272 |
| 2005/0006956 | A1 * | 1/2005 | Shi ............................. | 307/43 |
| 2005/0040800 | A1 * | 2/2005 | Sutardja ...................... | 323/283 |
| 2005/0141158 | A1 * | 6/2005 | Sae-Ueng et al. .......... | 361/91.1 |
| 2006/0145629 | A1 * | 7/2006 | Schmidt ................. | 315/209 R |

* cited by examiner

*Primary Examiner*—Michael Sherry
*Assistant Examiner*—Tien Mai
(74) *Attorney, Agent, or Firm*—Lily Neff, Esq.; Kevin P. Radigan, Esq.; Heslin Rothenberg Farley & Mesiti, P.C.

(57) ABSTRACT

A protection circuit for a parallel power system having at least two parallel coupled voltage regulators is disclosed. The protection circuit includes at least two isolation control circuits, each control circuit being coupled to a respective voltage regulator. Each isolation control circuit includes a current sense circuit for sensing current polarity at an output of the respective voltage regulator, and a controller for automatically isolating the respective voltage regulator when an over-voltage condition exists at an output of the parallel power system and a positive current polarity is sensed at the output of the respective voltage regulator. The at least two isolation control circuits isolate only a voltage regulator having positive current outflow during the over-voltage condition. In one embodiment, each isolation control circuit further includes an over-voltage detection circuit for detecting when the over-voltage condition exists at the output of the parallel power system.

17 Claims, 5 Drawing Sheets fig. 1
(PRIOR ART)

fig. 2 fig. 3 fig. 4 fig. 5

OVER-VOLTAGE PROTECTION FOR VOLTAGE REGULATOR MODULES OF A PARALLEL POWER SYSTEM

TECHNICAL FIELD

This invention relates generally to parallel computer power supply systems, and more particularly, to an over-voltage protection circuit and method for a parallel power supply system.

BACKGROUND OF THE INVENTION

Computer systems typically utilize parallel power supply systems. A parallel power supply system generally comprises a plurality of power sources such as DC-DC converters or voltage regulators connected in parallel to provide current to a load comprising one or more processors, memory devices, disk drives, etc.

Existing parallel power supplies employing PWM topologies allow "burst mode" which terminates switching on a properly functioning regulator macro in the presence of an over-voltage caused by a parallel regulator macro. This lack of switching is detectable and allows logic gates to discern which macro is the offending over-voltage producer (i.e., is actively switching), and correctly disable it. One example of such a circuit is described in U.S. Pat. No. 6,278,597 entitled "Conditional Over-Voltage Protection for Redundant Phase-Shift Converters."

Parallel voltage regulator modules (VRMs) are a new power system topology. Existing VRM parallel topologies do not protect well and typically only terminate switching activity on a faulty phase. However, if the over-voltage condition is due to a shorted high-side switch in a non-insolated topology (as opposed to a control loop or reference fault), then simply terminating switching activity does not remove the over-voltage fault, which compromises the redundant purpose.

Certain existing VRM parallel topologies make use of the well-defined "Intel Load Line" that droops more than 5 percent of nominal voltage at full load. By coordinating a sliding over-voltage threshold with load current, a VRM macro supporting load current would have a lower trigger threshold for an over-voltage trip and therefore be the first VRM of the parallel group to trip. VRMs not providing load (properly functioning in the presence of a over-voltage caused by a parallel macro) would have a higher trigger threshold and thus protect properly. This solution lacks two properties, however. First, light load conditions make the over-voltage thresholds identical for good and bad parallel VRMs, and secondly, for load line droop of certain technology, which can be 10× less than that of Intel requirements, the over-voltage trigger threshold is only fractions of a percent different between faulty VRMs and properly functioning VRMs, even at substantial load conditions.

Accordingly, a parallel power supply protection circuit is needed which can accurately isolate a particular voltage regulator module that is causing an over-voltage condition without causing a shut down of the entire parallel power system. The present invention meets this need.

SUMMARY OF THE INVENTION

The shortcomings of the prior art are overcome and additional advantages are provided through a protection circuit for a parallel power system having at least two parallel coupled voltage regulators. The protection circuit includes at least two isolation control circuits. Each isolation control circuit is coupled to a respective voltage regulator of the parallel power system, and includes a current sense circuit and a controller. The current sense circuit senses current polarity at an output of the respective voltage regulator, while the controller automatically isolates the respective voltage regulator when an over-voltage condition exists at an output of the parallel power system and a positive current polarity is sensed at the output of the respective voltage regulator. The at least two isolation control circuits of the protection circuit function to isolate only a voltage regulator having positive current outflow during the over-voltage condition.

In another aspect, a parallel power system is provided. This parallel power system includes at least two voltage regulators coupled in parallel, and at least two isolation control circuits. Each isolation control circuit is coupled to a respective voltage regulator of the parallel power system, and each circuit includes a current sense circuit and a controller. The current sense circuit senses current polarity at an output of the respective voltage regulator, while the controller automatically isolates the respective voltage regulator when an over-voltage condition exists at an output of the parallel power system and a positive current polarity is sensed at the output of the respective voltage regulator. Together, the at least two isolation control circuits of the protection circuit function to isolate only a voltage regulator having positive current outflow during the over-voltage condition.

In a further aspect, a method of protecting a parallel power supply having at least two parallel coupled voltage regulators is provided. The method includes: providing a separate isolation control circuit for each respective voltage regulator of the at least two voltage regulators. Each isolation control circuit includes logic for: sensing current polarity at an output of the respective voltage regulator; and automatically controlling isolation of the respective voltage regulator when an over-voltage condition exists at an output of the parallel power system and a positive current polarity is sensed at the output of the respective voltage regulator, wherein only a voltage regulator having positive current outflow during the over-voltage condition is isolated.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

The present invention relates to an over-voltage protection circuit for a parallel power system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

The present invention is disclosed in the context of a preferred embodiment. The present invention provides for an over-voltage protection circuit for a parallel power system. Through the use of a circuit or logic in accordance with the present invention, electronic devices powered by the system are protected against being damaged as the result of an over-voltage condition in one of the voltage regulator modules. Moreover, the over-voltage protection circuit in accordance with the present invention will not cause a shut down of the entire system should a voltage regulator experience an over-voltage condition. This results in a more stable and continuous operating environment.

More particularly, disclosed herein are techniques for detecting and isolating an over-voltage condition in any VRM topology, and particularly, one that employs multiple parallel VRM macros. For over-voltage protection in redundant, parallel VRM macros, a significant feature is the ability to detect just the over-voltage offender and to disable just that VRM macro. The difficulty lies with all macros reporting the same output voltage, how to determine which is the offending macro. As disclosed herein, output current polarity is employed to identify the offending macro. This is achieved by utilizing the already existing OR-ing FET at the output of each VRM macro. Further, provision is made for isolating a faulty VRM macro in a redundant multi-phase VRM design that allows continued operation in the remaining VRM macros in the presence of a shorted FET, or other voltage regulation loop fault, creating an over-voltage from the faulty VRM macro.

Figure 1:
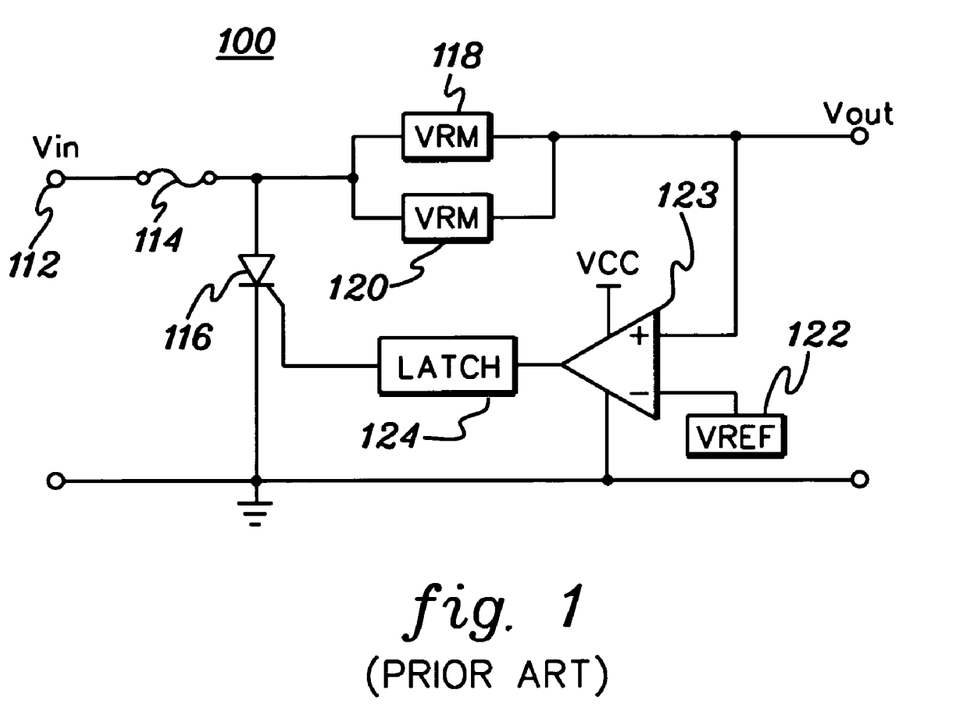
FIG. 1 depicts a typical parallel power supply configuration.

FIG. 1 depicts a typical parallel power supply configuration 100. This configuration 100 includes an input voltage 112, a fuse 114, a silicon controlled rectifier (SCR) 116, two parallel coupled VRMs 118, 120, a threshold voltage 122, a comparator 123, and a latch 124. A problem arises in this configuration when one of the VRMs in parallel initiates an over-voltage (OV) condition. When one of the VRMs 118, 120 goes OV, it turns on the SCR 116 which can blow the fuse 114 and cause the entire system to shut down. The system also lacks the ability to detect which VRM is creating the over-voltage condition. Further, noisy conditions produced by comparator 122 could cause the blowing of fuse 114. Once this happens, the VRMs will be without input power and the system will be forced to shut down. For many applications, this is not a desirable outcome.

Accordingly, there is a need in the art for a circuit which can isolate a particular voltage regulator that is in over-voltage condition, and shut only that over-voltage regulator down. Also, the circuit should accomplish this without causing a shut down of the entire power system.

Figure 2:
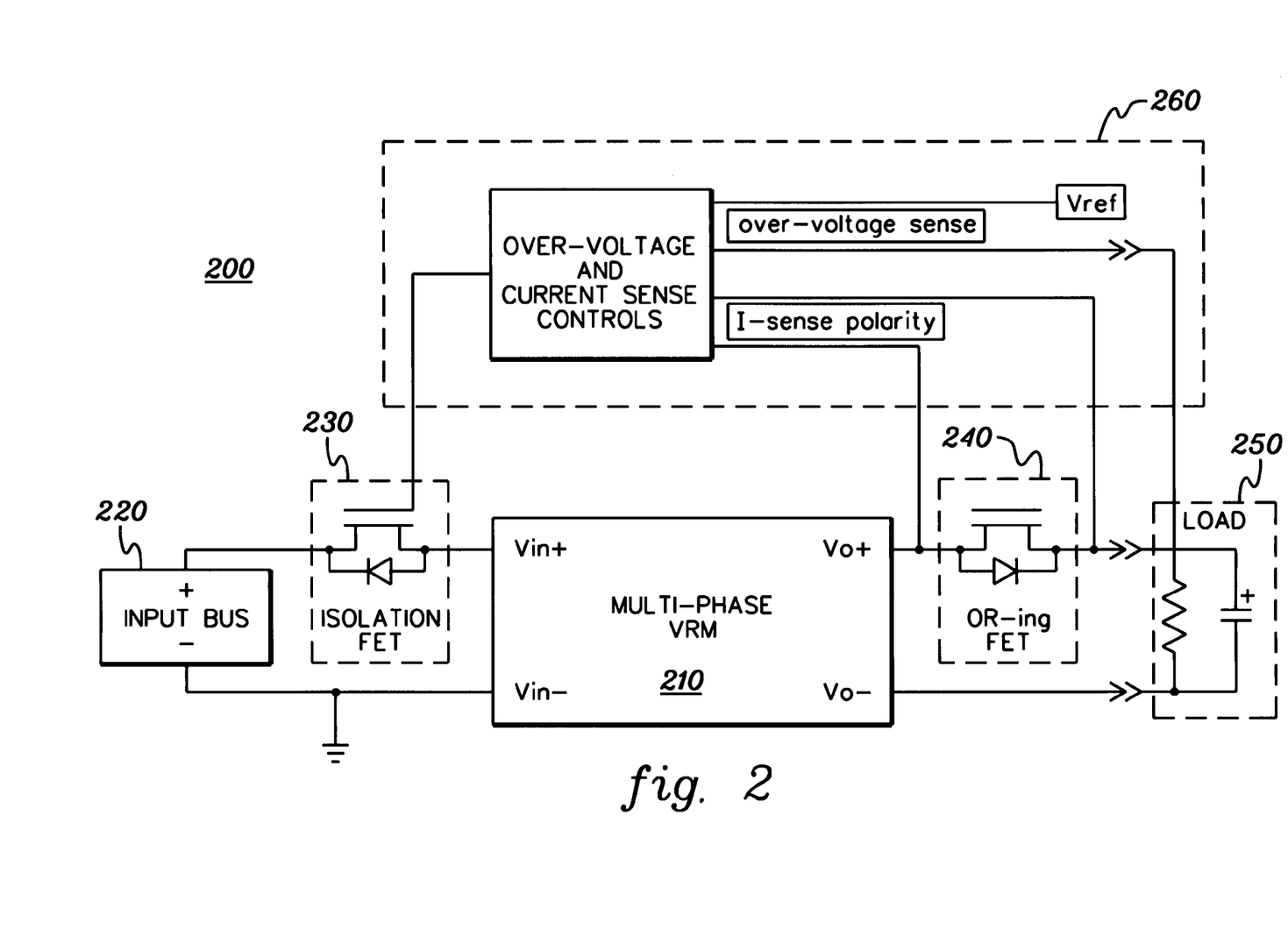
FIG. 2 is a simplified schematic diagram of a power supply system comprising a single multi-phase VRM and one embodiment of an isolation control circuit, in accordance with an aspect of the present invention.

FIG. 2 is a depiction of a power system 200 that includes a multi-phase voltage regulator module (VRM) 210 and a protection circuit in accordance with an aspect of the present invention. The protection circuit combines an over-voltage detection circuit with a current sensing circuit for sensing positive or negative current flow from the VRM module. A VRM with positive current outflow is identified as a faulty VRM during an over-voltage condition. The synchronous rectifier design of today's VRMs ensures that all other properly functioning VRMs will be sinking current, thus making detection of the one or more faulty VRMs absolutely conclusive, even in the presence of zero system load currents. A further part of the implementation is a means to disconnect all power from the non-isolated VRM since a high-side switch short must also be protected from sustaining an output over-voltage.

In the embodiment of FIG. 2, the protection circuit comprises an over-voltage and current sense controller 260, which gates an isolation FET 230 at the input of multi-phase VRM 210, and which senses the polarity across an OR-ing FET 230 located at the output of multi-phase VRM 210. Operationally, an input bus 220, such as a 12-volt input bus, powers VRM 210, which although shown as a multi-phase VRM, could alternatively comprise a single-phase VRM. In normal operation, power from input bus 220 is applied across the input of VRM 210 since isolation FET 230 is gated ON. Output from VRM 210 is the desired voltage level, which can typically range from one volt to 12 volts, depending on the load 250 technology, which is shown in the drawing as a simple RC circuit. The OR-ing FET 240 at the output of VRM 210 is normally gated ON and principally exists in the circuit to sense for an output short in the VRM. This FET 240 protects against an output short to ground situation. In accordance with the present invention, however, FET 240 is also employed to facilitate sensing the direction of current flow at the output of VRM 210. Controller 260 thus employs over-voltage detection, by comparison of the load voltage with a reference value (Vref), as well as a current-sense polarity determination at the output of VRM 210. Depending on the values of these determinations, the controller may gate isolation FET OFF in order to isolate a faulty VRM, as explained further below.

Figure 3:
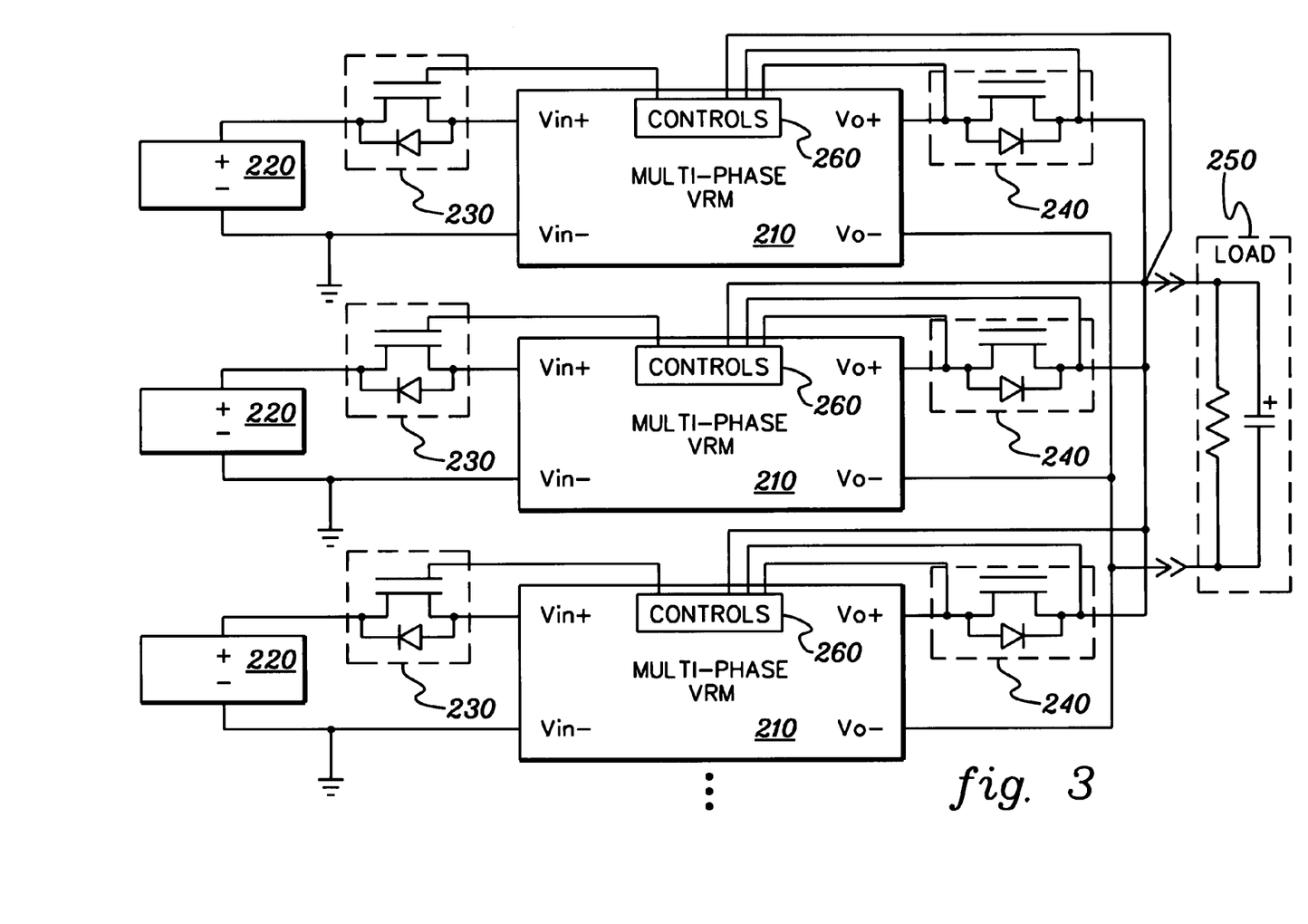
FIG. 3 is a simplified schematic diagram of one embodiment of a parallel power supply system employing a plurality of multi-phase VRMs coupled in parallel, each with its own isolation control circuit, in accordance with an aspect of the present invention.

FIG. 3 depicts one example of a redundant, parallel power system employing multiple multi-phase VRMs 210 connected in parallel to supply an electronic load 250, such as a processor module. This parallel power system implementation employs, by way of example, the same isolation circuitry embodiment as depicted in FIG. 2, with the over-voltage and current sense controls 260 shown depicted within the VRMs 210 as one example only. These controls 260 could alternatively reside external to the VRMs 210, such as shown in FIG. 2. In accordance with an aspect of the present invention, each VRM 210 has a detection and isolation circuitry so that no single point of failure across the parallel power system exists.

Figure 4:
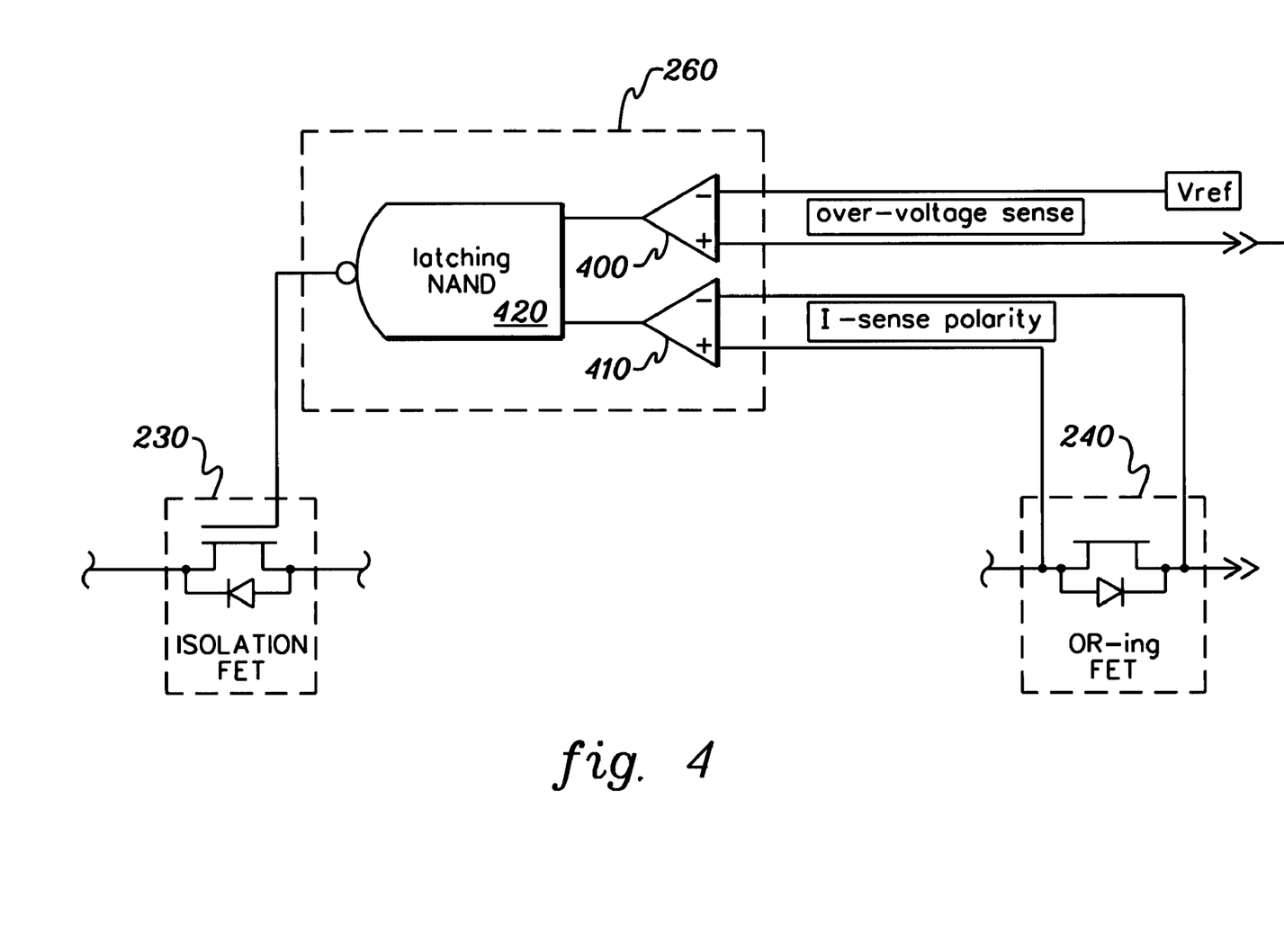
FIG. 4 is a simplified schematic diagram of one embodiment of an isolation control circuit, shown coupled between an isolation field effect transistor (FET) and an OR-ing FET connected at the input and output, respectively, of a voltage regulator module (not shown) of a power supply system such as depicted in FIGS. 2 & 3, in accordance with an aspect of the present invention.

FIG. 4 is a more detailed depiction of one hardware embodiment of the over-voltage and current sense controls 260 employed in FIGS. 2 & 3. As shown, in this embodiment, over-voltage detection is performed by a comparator 400 which compares the output voltage of the power system, i.e., the voltage at the load, with a threshold or reference voltage Vref. If the output voltage is greater than the reference voltage, then an over-voltage condition is detected. In an alternate embodiment, over-voltage detection could be a centrally implemented function for multiple isolation control circuits, with an appropriate over-voltage control signal being provided to each controller upon detection of the over-voltage condition, if such a single point of failure could be tolerated.

Figure 5:
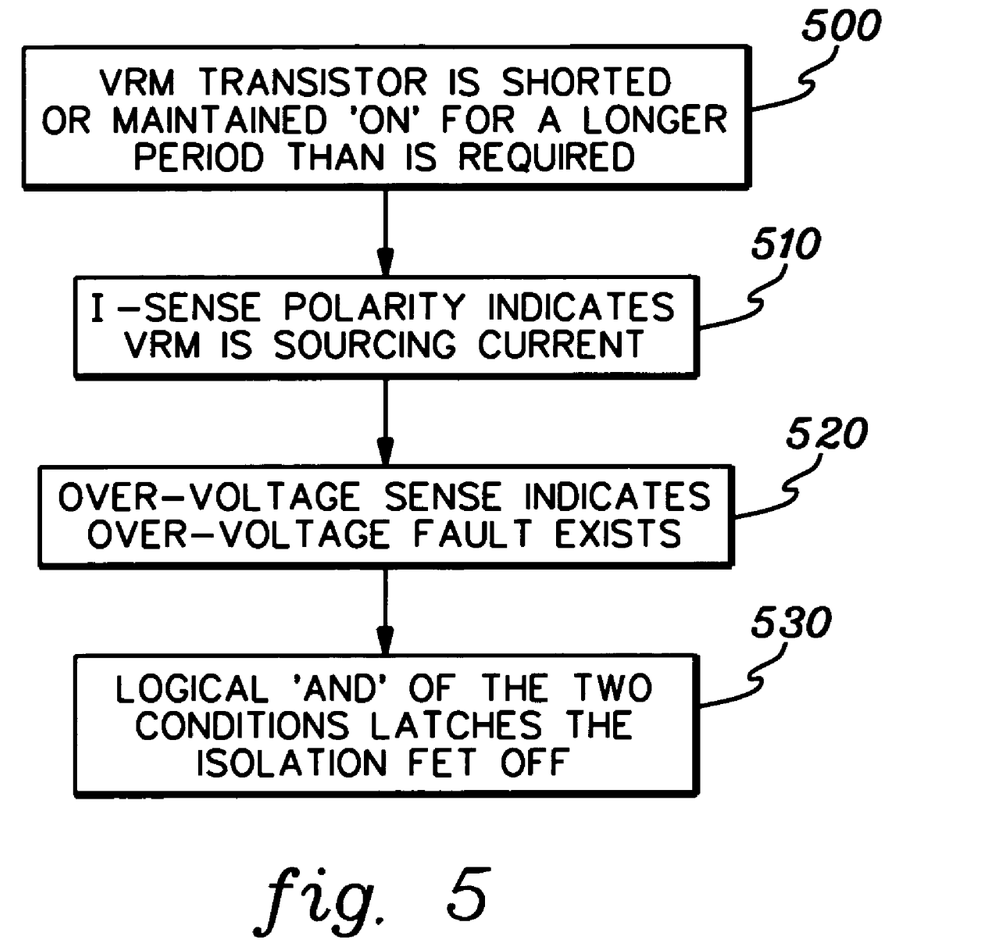
FIG. 5 is a flowchart of one embodiment of isolation control processing for a voltage regulator module, in accordance with an aspect of the present invention.

A separate comparator 410 senses voltage polarity across the OR-ing FET 240. If current flows out from the associated VRM (see FIGS. 2 & 3) this outflow is sensed by comparator 410 and an appropriate signal is provided to a latching NAND circuit 420. If both the over-voltage condition exists, and current flows out from the associated VRM, then NAND circuit 420 gates OFF isolation FET 230. This functioning is depicted in the flowchart of FIG. 5.

A single phase of a multi-phase VRM typically combines a PWM controller, a control FET, a synchronous FET, and an output inductor, as is known in the art. Referring to the logic chart of FIG. 5, if one VRM control FET is shorted or maintained ON for a longer period than is required, then an over-voltage may arise 500. The current polarity at the output of each VRM of a parallel power system is monitored to determine which VRM is sourcing current to the load 510. Further, each protection circuit determines that an over-voltage condition exists, indicating that an over-voltage fault is present 520. As a variation on this step, the over-voltage condition could be globally determined with a control signal being forwarded to each isolation circuit. A logical AND within each protection circuit determines whether both conditions exist, and if so, latches the associated isolation FET OFF at the input to the respective VRM 530.

To summarize, the protection scheme presented herein employs an output OR-ing FET in a detection technique for determining whether or not the associated VRM is supporting load current during an over-voltage condition. Since all VRMs see the same output voltage, and all detect the presence of an over-voltage condition when such a fault exists, determining whether or not the associated VRM is supporting load current indicates which VRM is faulty. The output OR-ing FET is already an essential part of a redundant solution since it is necessary to prevent a shorted low-side switch fault. The OR-ing FET drive is also designed for fast switching, and forward versus reverse current flow detection to support its purpose of low-side switch fault isolation. (A positive comparator 410 output represents current flowing out of the VRM.) Thus, current flow polarity sensing, when combined with over-voltage sensing, determines which is the faulty VRM to be isolated. A special VRM synchronous rectifier property is used. Properly functioning VRMs in the presence of an over-voltage will actually sink current. This makes current flow detection a very binary characteristic that is not related to system load current. Even at virtually zero system load, a faulty over-voltage producing VRM will be sourcing current into the properly working remaining VRMs that will be sinking current. The final part of the implementation is a means to disconnect all power from the non-isolated VRM, since a high-side switch short must also be protected from sustaining an output over-voltage.

Advantageously, through the use of a protection scheme in accordance with the present invention, the load is protected against being damaged as a result of an over-voltage condition in one or more the voltage regulator mododules. Moreover, over-voltage protection in accordance with the present invention isolates the voltage regulator module that is experiencing an over-voltage condition and shuts it down, without shutting down the entire system. This results in a more stable and continuous operating system.

As an enhancement, a micro-controller could be employed in place of the hardware controller embodiment of FIG. 4. In such a case, a current limiting electronic breaker could be used at the input to the associated voltage regulator.

Thus, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A protection circuit for a parallel power system comprising at least two parallel coupled multi-phase voltage regulator modules (VRMs), the protection circuit comprising:

at least two separate isolation control circuits, each separate isolation control circuit being coupled to a different multi-phase voltage regulator module of the at least two multi-phase voltage regulator modules of the parallel power system, and each separate isolation control circuit comprising:

a current sense circuit for sensing current polarity at an output of the respective multi-phase voltage regulator module;

a controller coupled to the current sense circuit for automatically isolating the respective multi-phase voltage regulator module when an over-voltage condition exists at an output of the parallel power system and a positive current polarity is sensed at the output of the respective multi-phase voltage regulator module, wherein the at least two isolation control circuits of the protection circuit isolate only a multi-phase voltage regulator module having positive current outflow during the over-voltage condition, and another multi-phase voltage regulator module of the at least two multi-phase voltage regulator modules remains operational; and wherein each multi-phase voltage regulator module employs a synchronous rectifier at an output stage thereof, the synchronous rectifier ensuring that the another multi-phase voltage regulator module is sinking current prior to the isolation of the multi-phase voltage regulator module having positive current outflow during the over-voltage condition.

2. The protection circuit of claim 1, wherein each separate isolation control circuit further comprises an isolation switch disposed at an input of the respective multi-phase voltage regulator module, wherein the controller is coupled to the isolation switch for automatically opening the switch to isolate the respective multi-phase voltage regulator module when the over-voltage condition exists and positive current polarity is sensed at the output of the respective multi-phase voltage regulator module.

3. The protection circuit of claim 2, wherein each isolation switch comprises an isolation field effect transistor coupled between an input power line and the input to the respective multi-phase voltage regulator module, and each isolation field effect transistor is gated OFF by the controller when the over-voltage condition exists and the positive current polarity is sensed at the output of the respective multi-phase voltage regulator module.

4. The protection circuit of claim 1, wherein each current sense circuit comprises a comparator having a first input and a second input, the first input and the second input being respectively coupled to source and drain sides of an OR-ing field effect transistor coupled to the output of the respective multi-phase voltage regulator module to sense current polarity through the OR-ing field effect transistor.

5. The protection circuit of claim 1, wherein each separate isolation control circuit further comprises an over-voltage detection circuit for detecting when an over-voltage condition exists at the output of the parallel power system, and wherein the controller is coupled to the over-voltage detection circuit for receiving an over-voltage detection signal when the over-voltage condition exists at the output of the parallel power system.

6. The protection circuit of claim 5, wherein each over-voltage detection circuit comprises a comparator having a first input and a second input, the first input being coupled to a reference voltage and the second input being coupled to the output of the parallel power system, wherein the over-voltage condition exists when a voltage at the output of the parallel power system exceeds the reference voltage.

7. A parallel power system comprising:
at least two multi-phase voltage regulator modules (VRMs) coupled in parallel; and
at least two separate isolation control circuits, each separate isolation control circuit being coupled to a respective multi-phase voltage regulator module of the at least two multi-phase voltage regulator modules of the parallel power system, and each separate isolation control circuit comprising:
a current sense circuit for sensing current polarity at an output of the respective multi-phase voltage regulator module;
a controller coupled to the current sense circuit for automatically isolating the respective multi-phase voltage regulator module when an over-voltage condition exists at an output of the parallel power system and a positive current polarity is sensed at the output of the respective multi-phase voltage regulator module, wherein the at least two isolation control circuits of the protection circuit isolate only a multi-phase voltage regulator module having positive current outflow during the over-voltage condition, and another multi-phase voltage regulator module of the at least two multi-phase voltage regulator modules remains operational; and
wherein each multi-phase voltage regulator module employs a synchronous rectifier at an output stage thereof, the synchronous rectifier ensuring that the another multi-phase voltage regulator module is sinking current prior to isolation of the multi-phase voltage regulator module having positive current outflow during the over-voltage condition.

8. The parallel power system of claim 7, wherein each separate isolation control circuit further comprises an isolation switch disposed at an input of the respective multi-phase voltage regulator module, wherein the controller is coupled to the isolation switch for automatically opening the switch to isolate the respective multi-phase voltage regulator module when the over-voltage condition exists and positive current polarity is sensed at the output of the respective multi-phase voltage regulator module.

9. The parallel power system of claim 8, wherein each isolation switch comprises an isolation field effect transistor coupled between an input power line and the input to the respective multi-phase voltage regulator module, and each isolation field effect transistor is gated OFF by the controller when the over-voltage condition exists and the positive current polarity is sensed at the output of the respective multi-phase voltage regulator module.

10. The parallel power system of claim 7, wherein each current sense circuit comprises a comparator having a first input and a second input, the first input and the second input being respectively coupled to source and drain sides of an OR-ing field effect transistor coupled to the output of the respective multi-phase voltage regulator module to sense current polarity through the OR-ing field effect transistor.

11. The parallel power system of claim 7, wherein each separate isolation control circuit further comprises an over-voltage detection circuit for detecting when an over-voltage condition exists at the output of the parallel power system, and wherein the controller is coupled to the over-voltage detection circuit for receiving an over-voltage detection signal when the over-voltage condition exists at the output of the parallel power system.

12. The parallel power system of claim 11, wherein each over-voltage detection circuit comprises a comparator having a first input and a second input, the first input being coupled to a reference voltage and the second input being coupled to the output of the parallel power system, wherein the over-voltage condition exists when a voltage at the output of the parallel power system exceeds the reference voltage.

13. A method of protecting a parallel power supply comprising at least two parallel coupled multi-phase voltage regulator modules (VRMs), the method comprising:
providing a separate isolation control circuit for each respective multi-phase voltage regulator module of the at least two multi-phase voltage regulator modules, each separate isolation control circuit:
sensing current polarity at an output of the respective multi-phase voltage regulator module;
automatically controlling isolation of the respective multi-phase voltage regulator module when an over-voltage condition exists at an output of the parallel power system and a positive current polarity is sensed at the output of the respective multi-phase voltage regulator module, wherein only a voltage regulator having positive current outflow during the over-voltage condition is isolated, and another multi-phase voltage regulator module of the at least two multi-phase regulator modules remains operational; and
wherein each multi-phase voltage regulator module employs a synchronous rectifier at an output stage thereof, the synchronous rectifier ensuring that the another multi-phase voltage regulator module is sinking current prior to isolation of the multi-phase voltage regulator module having positive current outflow during the over-voltage condition.

14. The method of claim 13, wherein the automatically controlling further comprises open circuiting an input of the respective multi-phase voltage regulator module when the respective multi-phase voltage regulator module has positive current outflow during the over-voltage condition.

15. The method of claim 13, wherein the sensing comprises comparing signals at source and drain sides of an OR-ing field effect transistor coupled to the output of the respective multi-phase voltage regulator module to determine current polarity at the output.

16. The method of claim 13, wherein each separate isolation control circuit further detects when an over-voltage condition exists at the output of the parallel power system, said detecting comprising comparing a voltage at the output of the parallel power system with a reference voltage, and when the voltage at the output of the parallel power system exceeds the reference voltage, signaling that an over-voltage condition exists.

17. The method of claim 13, wherein the providing comprises providing each separate isolation control circuit to be common to all phases of the respective, multi-phase voltage regulator module.

* * * * *